United States Patent [19]

McElreath

[11] Patent Number: 5,216,611
[45] Date of Patent: Jun. 1, 1993

[54] INTEGRATED ENROUTE AND APPROACH GUIDANCE SYSTEM FOR AIRCRAFT

[75] Inventor: Kenneth W. McElreath, Cedar Rapids, Iowa

[73] Assignee: Rockwell International Corporation, Seal Beach, Calif.

[21] Appl. No.: 652,762

[22] Filed: Feb. 8, 1991

[51] Int. Cl.$^5$ .............................................. G06F 15/50
[52] U.S. Cl. .................................... 364/454; 364/428; 342/413
[58] Field of Search ............... 364/427, 428, 443, 449, 364/453; 342/410, 413

[56] References Cited

U.S. PATENT DOCUMENTS

| | | | |
|---|---|---|---|
| 4,534,000 | 8/1985 | Bliss ..................................... | 364/428 |
| 4,792,904 | 12/1988 | Reinagel et al. ..................... | 364/429 |
| 4,814,771 | 3/1989 | Bahr et al. ........................... | 342/389 |
| 4,894,655 | 1/1990 | Jogu et al. ............................ | 340/988 |
| 4,899,285 | 2/1990 | Nikayama ............................ | 364/453 |

*Primary Examiner*—Thomas G. Black
*Attorney, Agent, or Firm*—M. Lee Murrah; V. Lawrence Sewell; H. Frederick Hamann

[57] ABSTRACT

Data from long range aids such as the global positioning system (GPS) and an inertial navigation system (INS) and short range aids such as a microwave landing system (MLS) are used to smoothly and automatically transition an aircraft from the long range aids to the short range aids. During cruise a Kalman filter combines data from the global positioning system and the inertial navigation system to provide accurate enroute information. When the aircraft arrives in the vicinity of the airport and begins to acquire valid data from the microwave landing system, the Kalman filter is calibrated with the MLS data to permit Precision landing with GPS/INS data alone in case the MLS system subsequently fails. In addition, navigation information begins to be derived from a weighted sum of the GPS/INS and MLS data, the weighting being determined by distance from the airport. In a first region farthest from the airport, the GPS/INS data is given a 1.0 weighting factor; and in a second region nearest the airport, the MLS data is given a 1.0 weighting factor. In a third region intermediate the first and second regions, the GPS/INS data and MLS data are proportionately and complementarily weighted as a function of the distance from the airport. If the MLS system fails, the weighting system is disabled and navigation data is again derived from the GPS/INS combination. In addition, the data from both systems are monitored, and a cockpit alarm is sounded if the data diverges beyond a specified amount.

24 Claims, 2 Drawing Sheets ic system in which the present invention may be used is shown. The central element of the integrated avionic system is flight management system 10 which coordinates and controls the other components of the system, including a flight display system 12, a flight control system 14, a navigation sensor system 16, a communication system 18, mission avionics 20 and an air data system 22.

INTEGRATED ENROUTE AND APPROACH GUIDANCE SYSTEM FOR AIRCRAFT

BACKGROUND OF THE INVENTION

The invention relates to new and useful improvements in aircraft navigation and airspace control systems, and more particularly to such systems using the global positioning system and the microwave landing system.

In recent years aircraft navigation and airspace control have been vastly improved by introduction of the global positioning system (GPS) and the microwave landing system (MLS). These systems supplement the existing inertial navigation systems (INS) or radionavigation systems currently used for enroute navigation, and instrument landing system (ILS) for terminal guidance. GPS uses special radio receivers in an aircraft to receive radio signals transmitted from an array of earth satellites. Using the information from the satellites, an aircraft receives and calculates its position within 50-150 feet in all three dimensions. The MLS replaces the VHF ILS with an approach and landing system using microwave signals. This provides a much more accurate and flexible landing system which permits the number of takeoff and landing operations at an airport to be sharply increased.

In the present practice, the GPS, INS and MLS systems are used separately at the discretion of the pilot, or the GPS and INS data are combined to give integrated GPS/INS enroute navigation information. The transition from GPS/IN navigation used enroute to the MLS navigation needed for landing is manual and is determined by the pilot. This transition from one navigation system to another normally occurs at a time of high cockpit workload and navigational uncertainty and thus can decrease aircraft safety. In addition, the transition is abrupt and the flight path can be adversely affected by the differences due to errors in each device. Due to such discrete transitions, extra reliance must be placed upon ground controller vectoring, especially when combined with a specified time of arrival for spacing and sequencing. Since ground controllers are otherwise fully occupied, the extra work related to ground vectoring increases the chances of mistakes by controllers which can compromise safety. Further, each of these devices is subject to errors, and independent operation does not use one device to check the accuracy of the others.

It is therefore an object of the present invention to provide an aircraft navigation system which integrates the GPS/INS and MLS navigation systems.

It is another object of the present invention to provide an aircraft navigation system which gradually shifts between the GPS and MLS systems.

It is a further object of the present invention to provide an aircraft navigation system which minimizes errors associated with switching from the GPS/INS navigation system to the MLS navigation system.

It is an additional object of the present invention to provide a highly automated enroute, transition and terminal navigation system.

It is yet another object of the present invention to provide an aircraft navigation system which uses the optimimum type of navigation information for each phase of an aircraft mission or flight.

It is yet a further object of the present invention to provide crosschecking of several navigation systems to detect anomalous errors and to automatically compensate therefor.

It is yet an additional object of the present invention to provide a multi-source aircraft navigation system which decreases cockpit workload in critical phases of a flight and thus decreases the chances of mishap resulting from crew distraction or navigational uncertainty.

It is still another object of the present invention to provide an aircraft navigation system which minimizes the need for ground controller vectoring.

It is still an additional object of the present invention to provide an integrated navigation system which relies soley upon MLS guidance for final terminal guidance in accordance with certification criteria for landing approaches.

Still other objects will become apparent in the following summary and description of a preferred embodiment of the invention.

SUMMARY OF THE INVENTION

Data from multiple navigation systems are used to smoothly and automatically transition from a first system to a second system. Data from the first system is continuously received and used for navigation purposes until valid data begins to be received from the second navigation system. The data from the first and second navigation systems are then combined to provide a sum of the two sets of data which are complementarily weighted as a function of the distance from a predetermined point associated with the second navigation system.

In another aspect of the invention, data from the second navigation system is used to calibrate the data from the first navigation system when valid data from the second navigation system is received. This permits the first navigation system to substitute for the second navigation system if the second system subsequently fails.

BRIEF DESCRIPTION OF THE DRAWINGS

The invention may be more fully understood by reading the following description of a preferred embodiment of the invention in conjunction with the appended drawings wherein.

DETAILED DESCRIPTION OF A PREFERRED EMBODIMENT

Figure 1:
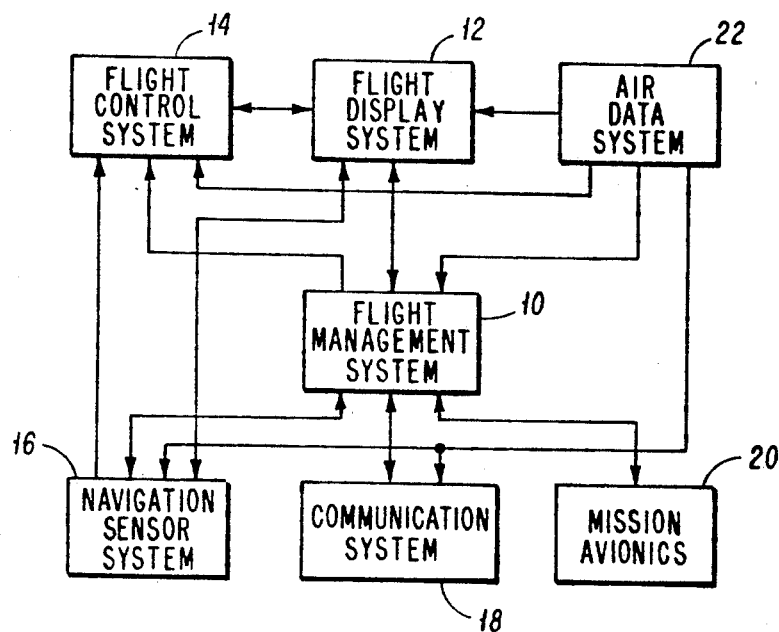
FIG. 1 is a block diagram of a typical integrated avionic system in which the present invention may be used.

Referring first to FIG. 1, a typical integrated aircraft avionic system in which the present invention may be used is shown. The central element of the integrated avionic system is flight management system 10 which coordinates and controls the other components of the system, including a flight display system 12, a flight control system 14, a navigation sensor system 16, a communication system 18, mission avionics 20 and an air data system 22.

Data from the various systems and results generated by flight management system 10 are displayed on one or more displays comprising flight display system 12. The aircraft may be controlled by an autopilot, autothrottle and other components comprising flight control system 14. Information on aircraft position may be provided by navigation sensor system 16, which can include a wide variety of functions including GPS, inertial navigation, TACAN, VOR/ILS, MLS, automatic direction finder, and radar altimeter. Communication with airport, enroute control facilities and other aircraft is provided by a communication system 18. In the case of military aircraft, special capabilities, including targeting radar and weapons may be provided by mission avionics 20. Finally, air data system 22 provides air mass referenced performance data used in controlling the aircraft and estimating wind and other factors which affect aircraft guidance.

Figure 2:
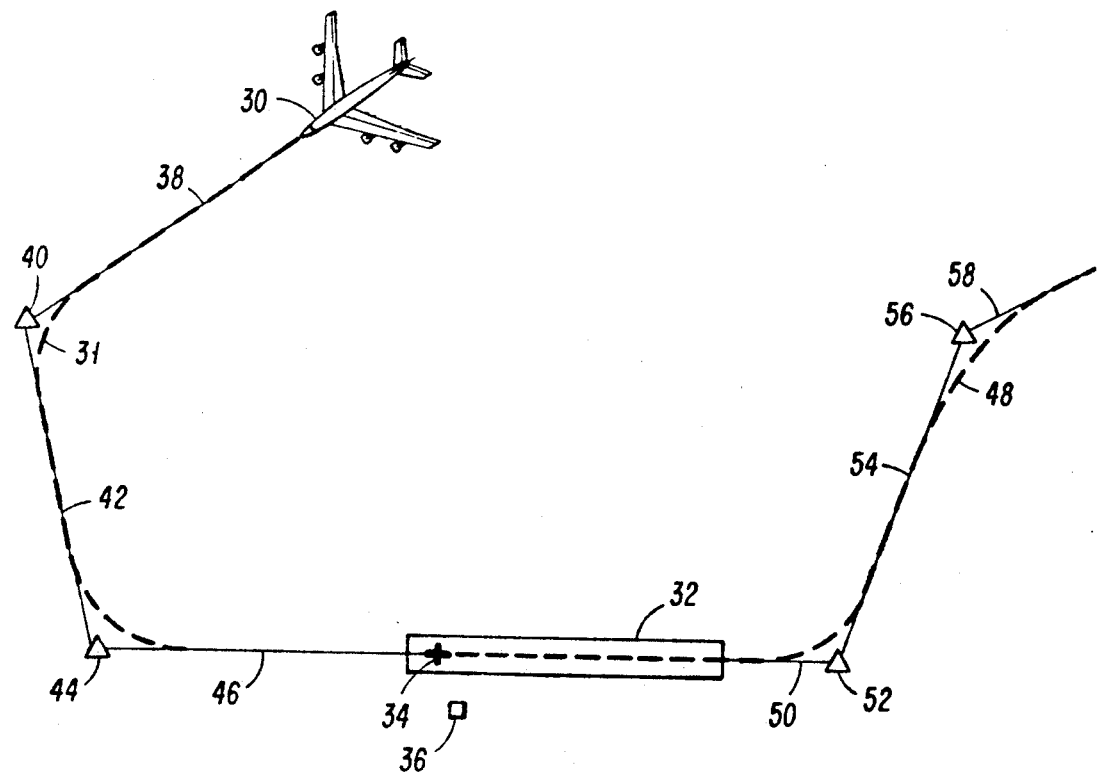
FIG. 2 is a diagrammatic depiction of an operational scenario for the present invention.

Referring to FIG. 2, an operational scenario for the present invention is illustrated. An enroute aircraft 30 progresses along a flight path 31 (dotted line) comprising several segments which are related to the present invention, toward a landing on an airport runway 32 at touchdown (landings), or air release point (for cargo or personnel air drops), 34. Associated with runway, or drop zone, 32 is an MLS transmitter 36. For arrivals a cruising aircraft 30 may travel along an enroute leg 38 to a waypoint 40 using GPS, or other RNAV system, and inertial navigation system information only for navigation. At waypoint 40 aircraft 30 may travel along a transition and initial approach segment 42 to a waypoint 44 using a blend of GPS, INS, and MLS information. From waypoint 44 aircraft 30 travels along final approach segment 46 with increasing and finally total dependence on MLS information.

On departures aircraft 30 may follow a flight path 48 comprising several segments also associated with the present invention. Initially, departing aircraft 30 may travel along a takeoff segment 50 to a waypoint 52 using MLS for navigation. At a prescribed distance from the touchdown or airdrop point 52 aircraft 30 begins to use a blend of MLS, INS and GPS information to waypoint 56. At waypoint 56 aircraft 30 follows departure enroute segment 58 using GPS and INS information for navigation with decreasing weighting of MLS information.

Figure 3:
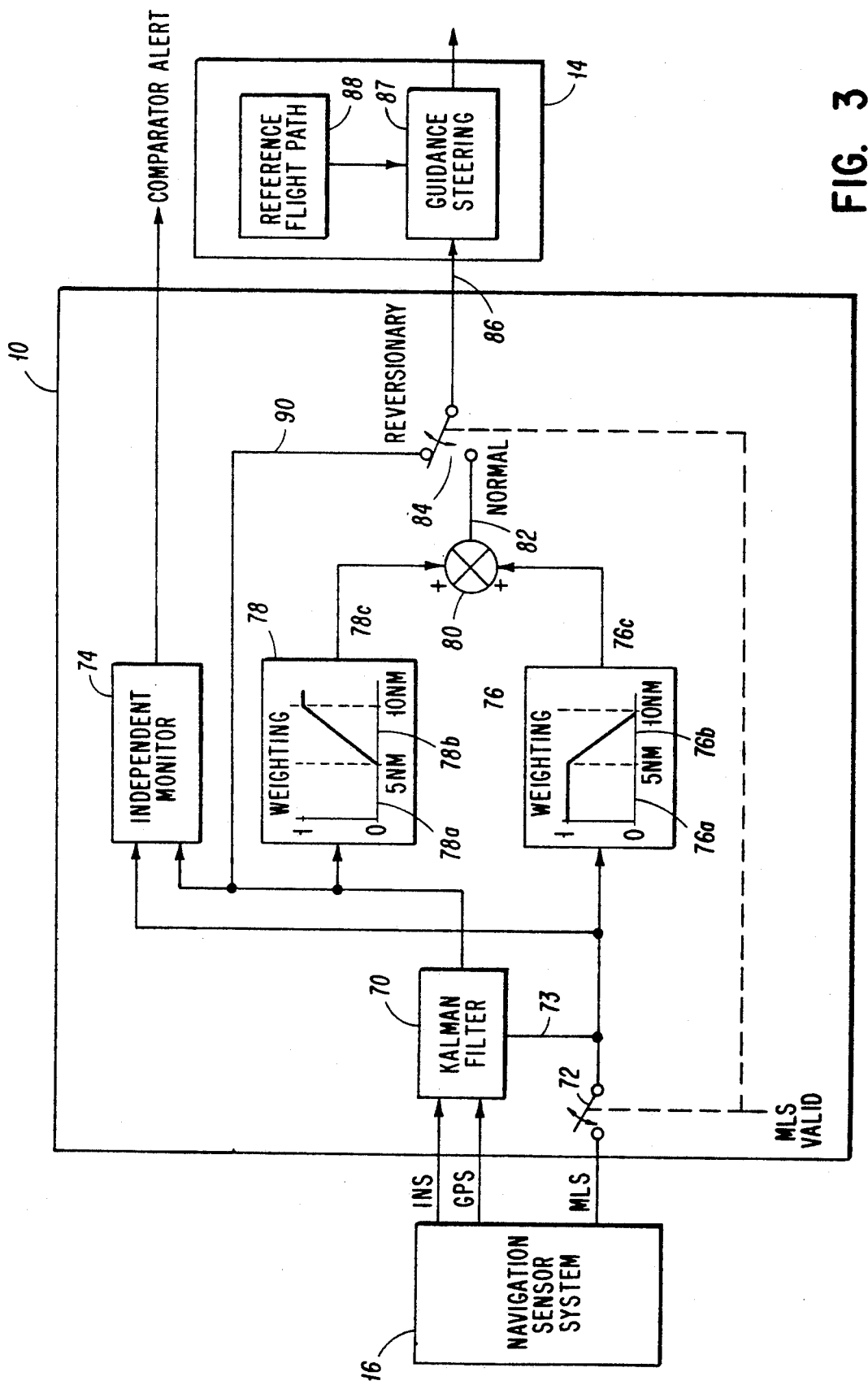
FIG. 3 is a functional block diagram of the aircraft navigation system of the present invention.

The waypoints for both aircraft arrival and departure are arbitrarily chosen, and the use of various navigation aids may not necessarily be bounded by the waypoints. Referring now to FIG. 3, a functional block diagram of the present invention is shown. To provide context, the various elements of FIG. 3 are grouped together to relate them to flight management system 10 and flight control system 14 as shown in FIG. 1. In addition, navigation sensor system 16 is also shown in FIG. 3 to indicate the source of input data. It should be understood that certain necessary but conventional functions well known in the art, such as coordinate reference transformations, reasonableness checking and initialization, are omitted from FIG. 1 to clearly show the unique features of the invention.

The present invention uses two typical radio navigation sources, GPS and MLS, the former of which is normally used for enroute navigation and the latter for terminal area navigation. It should be understood, however, that the specific navigation systems are merely illustrative, and any other equivalent system could be used. In addition, the present invention uses INS information from the aircraft's onboard inertial navigation system, primarily for short term flight control and complementing the GPS data. Navigation sensor system 16 thus provides GPS, INS, and MLS data signals to flight management system 10 via the similarly labeled lines.

The INS and GPS data signals are fed to a Kalman filter 70 whose function is to estimate inertial system errors. Kalman filters are discussed in Brown, Robert Grover, Random Signal Analysis and Kalman Filtering (John Wiley and Sons, 1983), which is incorporated herein by reference.

The MLS data signal is fed through a single pole, single throw switch 72, or equivalent, to an independent monitor 74 and a first weighting device 76. The MLS position and velocity signals are also fed to Kalman filter 70 via line 73. These signals are used to improve the accuracy of Kalman filter 70 and to calibrate the GPS speed and positional errors relative to the airport terminal area. Switch 72 is closed only if a valid MLS signal is received. As the graph associated with device 76 indicates, weighting device 76 multiplies the signal from Kalman filter 70 by a factor between 0 and 1.0 depending upon the distance from a reference point associated with the target runway. The specific distances used in the following description, and in the other weighting device to be described hereinafter, are exemplary; and other distances may be used as required. When the distance from the target runway reference point is less than 5 nautical miles (graph region 76a), for example, the multiplier is 1.0; and when the distance is greater than 10 nautical miles (graph region 76c), the multiplier is 0. Between 5 and 10 nautical miles (graph region 76b) the multiplier varies linearly between 1.0 and 0 as a function of distance.

The output of Kalman filter 70 is fed both to independent monitor 74 and to second weighting device 78. Similarly to device 76, as indicated by the graph, weighting device 78 multiplies the signal from Kalman filter 70 by a factor between 0 and 1.0 depending upon the distance from a reference point associated with the target runway. As with weighting device 76, the specific distances used in the following description are exemplary, and other distances may be used as required. When the distance from the target runway reference point is less than 5 nautical miles, for example (graph region 78a), the multiplier is 0; and when the distance is greater than 10 nautical miles (graph region 78c), the multiplier is 1.0. Between 5 and 10 nautical miles (graph region 78b) the multiplier varies linearly between 0 and 1.0 as a function of distance.

Both weighting devices 76 and 78 comprise specialized multipliers which multiply, or weight, an incoming signal by a factor determined by a control parameter. In this case the control parameter is the distance from the runway reference point.

The output signals from weighting devices 76 and 78 are summed together in summer 80 to provide a NORMAL composite navigation signal on line 82. As may be observed the multipliers for weighting devices 76 and 78 are complementary such that at any distance from the target runway, the sum of the multipliers is 1.0. This results in a NORMAL composite navigation signal which proportionally blends the two input signals. While the multipliers in devices 76 and 78 are shown as having linear transfer characteristics between 5 and 10 miles, they may have any other shape so long as they are complementary and their sum is 1.0.

The composite navigation signal on line 82 is coupled via a double pole, single throw switch, or equivalent, 84 and line 86 to guidance steering device 86 in flight control system 14. Guidance steering device 86 compares the composite navigation signal on line 83 to a signal representative of the desired flight path provided by reference device 88 to provide an error estimate used to generate control signals for the aircraft flight controls. Reference device 88 describes the desired aircraft horizontal and vertical flight path in mathematical terms, e.g., a straight line, a series of line segments or a curved path. The geometric descriptions of the flight path comprise conventional analytical expressions using latitude/longitude, ECEF (earth-centered, earth-fixed), or other suitable coordinate reference frame.

Switch 84 couples the composite navigation signal on line 82 to guidance steering device 87 only if the MLS signal is valid. Otherwise, switch 84 couples guidance steering device 87 via line 86 to REVERSIONARY signal on line 90, which is derived from the output of Kalman filter 70. In other words, the navigation signal used by guidance steering device 87 is derived from the combination of the INS/GPS and MLS signals when the MLS signal is valid and from the INS/GPS signal only, if the MLS signal is not valid.

Guidance and steering device 87 describes the aircraft situation with respect to the reference flight path provided by reference device 88 in terms of positional and velocity (path vector) errors. Device 88 computes the perpendicular, horizontal and vertical distance from the reference flight path to the sensed/estimated aircraft position by taking the vector difference and converting it into scalar error quantities. Similarly, the velocity error from the reference path direction is also calculated.

The positional and velocity errors are summed and differenced with other aircraft feedback parameters, such as attitude and heading, to produce stable control signals which command the aircraft control surfaces. The control inputs cause the aircraft to modify its flight path so that the error from the reference flight path is continually corrected toward zero. There are many forms of feedback control systems well known in the art which are used to implement the guidance and steering functions. One example is described in Etkin, Bernard, Dynamics of Flight (John Wiley and Sons, 1959), which is incorporated herein by reference.

Independent monitor 74 receives and compares both the MLS information and the information from Kalman filter 70. Independent monitor 74 evaluates the integrity of the MLS signal by comparing it with the integrated solution provided by Kalman filter 70 and provides an alert or automatic reversion when a difference greater than a predetermined threshhold is detected. The threshhold value may be constant, or it may be a function of flight phase. It may be implemented as a straightforward mathematical difference.

In operation, Kalman filtered GPS and INS position and velocity data are used as the primary source for navigational guidance when aircraft 30 is enroute on segment 38 of the flight path (see FIG. 2). When aircraft 30 comes into range of valid MLS signal coverage, the MLS position and velocity data are fed to Kalman filter 70 (FIG. 2) to reconcile differences between the GPS and MLS data for the airport terminal area. The Kalman filtered solution and the MLS solution are blended together in a complementary fashion and then gradually separated as a function of range, such as in the range 5 to 10 nautical miles in the present exemplary embodiment, such that only MLS data is used for the close-in terminal guidance. The reverse process occurs on the takeoff leg of a flight. This serves three purposes. First, it meets the certification criteria for precision terminal guidance using MLS only. Second, it enables the Kalman filtered solution to act as an independent performance monitor of MLS guidance, which is especially important at airports having only one MLS ground transmitter or receiver. Third, it enables switching to the Kalman filtered GPS/INS solution should the MLS become invalid. The GPS/INS solution can maintain the same accuracy as the MLS solution for a considerable time since the Kalman filtered solution is calibrated to the MLS system when the MLS signal is initially acquired. If the MLS failure occurs during the last portion of the approach, i.e., during flare and touchdown, the reversionary guidance would be sufficiently accurate and reliable to complete the maneuver. If the GPS/INS system were not calibrated, the GPS/INS solution alone would not permit a precision approach to be continued.

Thus, it may be seen that the present invention provides a single, blended 3-dimensional airspace navigation and guidance solution for an entire flight from takeoff to landing. This solution derived from GPS, MLS and other enroute and terminal navigation systems is optimized for the requirements of each mission phase, especially the accurcies needed for takeoff, landing and precise aerial delivery. In addition, real time calibration and cross checking of independent navigation sources is performed. This provides alerts when anomalous errors due either to equipment failure or human errors are detected. Further, if a failure of the MLS occurs, an automatic reversionary mode permits a flight maneuver to be continued with the same or higher approach minima as determined by certification and performance accuracy requirements. Continuation of an approach down to Category II minima (100 feet DH) without MLS signals, or perhaps Category III landings, may be attained. Further in an autoland system, the present invention provides calibrated GPS as a third independent source for voting and monitoring purposes, thus enabling a Category III approach to be completed even if an MLS receiver fails, wherein two MLS receivers are normally operational.

The operational features of the present invention offer large benefits, including improved flight safety; fewer aborted missions, takeoffs and landings; more efficient air traffic management; higher airspace handling capacity; and increased crew confidence for terminal area operations.

While particular embodiments of the present invention have been shown and described, it should be clear that changes and modifications may be made to such embodiments without departing from the true scope and spirit of the invention. It is intended that the appended claims cover all such changes and modifications.

I claim:

1. An integrated system for guiding an aircraft to a predetermined destination, which uses data generated by both a long range navigation system and a short range navigation system, comprising:

means for deriving the data from the long range navigation system;

means for deriving the data from the short range navigation system; and automatic means for providing a weighted sum of said data from said long range navigation system and said data from said short range navigation system, said sum being weighted as a function of the distance from a predetermined location related to one of each of said long range navigation system or said short range navigation system.

2. An integrated system for guiding an aircraft to a predetermined destination as described in claim 1 wherein said sum is weighted linearly between a first and second distance from said predetermined location.

3. An integrated system for guiding an aircraft to a predetermined destination as described in claim 2 further including means for generating aircraft control data from said data from said long range navigation system and said short range navigation system.

4. An integrated system for guiding an aircraft to a predetermined destination as described in claim 3 further including means for bypassing said providing means when valid data ceases to be derived from said short range navigation transmitter.

5. An integrated system for guiding an aircraft to a predetermined position as described in claim 4 further including:
 means for detecting acquisition of valid data from said short range navigation system; and
 means responsive to the detecting means for calibrating said data from said long range navigation system.

6. An integrated system for guiding an aircraft to a predetermined destination as described in claim 5 further including means for providing an alert if said data from said short range navigation system diverges from said data from said long range navigation system beyond a predetermined amount.

7. An integrated system for guiding an aircraft to a predetermined destination as described in claim 6 wherein said long range navigation system comprises an inertial navigation system onboard the aircraft and a radionavigation system external to said aircraft and further including means for combining data from the inertial guidance system and data from the radionavigation system.

8. An integrated system for guiding an aircraft to a predetermined destination as described in claim 7 wherein said combining means comprises a Kalman filter.

9. An integrated system for guiding an aircraft to a predetermined destination as described in claim 8 wherein said short range navigation system comprises a microwave landing system.

10. An integrated system for guiding an aircraft to a predetermined destination as described in claim 9 wherein said radionavigation system comprises a global positioning system.

11. An integrated system for guiding an aircraft to a predetermined destination which uses data generated by both a first navigation system having a broad coverage and a second navigation system having coverage in the vicinity of the predetermined destination, comprising:
 means for deriving the data from the first navigation system;
 means for deriving the data from the second navigation system;
 first means for selectively gating said data from said second navigation system;
 means for handling said data from said first navigation system;
 means for generating a weighted sum of said data from said first navigation system and said data from said second navigation system, said weight being a function of the distance from a predetermined location related to said second navigation system;
 second means for selectively gating data either from said handling means or from said generating means; and
 means for generating aircraft control data from said data from said long range navigation system and said short range navigation system.

12. An integrated system for guiding an aircraft to a predetermined destination as described in claim 11 wherein said generating means comprises:
 first means for weighting said data from one of either said first or said second navigation systems;
 second means for weighting said data from the other of said first or said second navigation systems, said first and second weighting means having complementary weighting functions; and
 means for summing weighted data from the first and second weighting means.

13. An integrated system for guiding an aircraft to a predetermined destination as described in claim 11 wherein said first selective gating means provides said data from second navigation system upon initial acquisition of valid data from said second navigation system.

14. An integrated system for guiding an aircraft to a predetermined destination as described in claim 13 wherein said second selective gating means ceases to provide data from said generating means upon loss of valid data from said second navigation system.

15. An integrated system for guiding an aircraft to a predetermined destination as described in claim 14 further including means for calibrating said data from said first navigation system upon acquisition of valid data from said second navigation system.

16. An integrated system for guiding an aircraft to a predetermined destination as described in claim 15 wherein said means for deriving said data from said first navigation system includes a Kalman filter.

17. An integrated system for guiding an aircraft to a predetermined destination as described in claim 16 wherein said first navigation system comprises an inertial navigation system onboard the aircraft and a radionavigation system external to said aircraft and further including means for deriving said data from said first navigation system.

18. An integrated system for guiding an aircraft to a predetermined destination as described in claim 17 wherein said second navigation system comprises a microwave landing system.

19. An integrated system for guiding an aircraft to a predetermined destination as described in claim 18 wherein said radionavigation system comprises a global positioning system.

20. An integrated system for guiding an aircraft to an airport, which uses data generated by an inertial navigation system, a global positioning system and a microwave landing system, comprising:
 means for deriving the data from the inertial navigation system;
 means for deriving the data from the global positioning system;
 means for combining said data from said inertial navigation system and said global positioning system to provide composite navigation data;
 means for deriving the data from the microwave landing system;
 first means for weighting either one of said composite data or said microwave landing system data;
 second means for weighting the other of the other of said composite data or said microwave landing system data, said first and second weighting means having complementary weighting functions;

said weighting being a function of the distance from a predetermined location related to one of said global positioning system or said microwave landing system;

means for summing data from the first and second weighting means;

first means for selectively gating said microwave landing system data to said second weighting means and said combining means;

second means for selectively gating data either from said combining means or from said summing means; and means for generating aircraft control data from the data from said data gated by the second gating means.

21. An integrated system for guiding an aircraft to an airport as described in claim 20 wherein said combining means comprises a Kalman filter.

22. An integrated system for guiding an aircraft to an airport as described in claim 21 wherein said first gating means begins gating said microwave landing system when valid microwave landing system data is received.

23. An integrated system for guiding an aircraft to an airport as described in claim 22 further including means for calibrating said Kalman filter when said microwave landing system data is initially gated by said first gating means.

24. An integrated system for guiding an aircraft to an airport as described in claim 23 wherein said second gating means ceases to gate data when valid microwave landing system data ceases to be received.

* * * * *